United States Patent [19]

Carre

[11] 4,251,813
[45] Feb. 17, 1981

[54] ELECTRONIC CHECKLIST USING SOLID STATE READOUTS

[76] Inventor: Franklin E. Carré, 4068 Delcon Court, Loveland, Colo. 80537

[21] Appl. No.: 17,192

[22] Filed: Mar. 5, 1979

[51] Int. Cl.³ .............................................. G06F 3/147
[52] U.S. Cl. .................................. 340/706; 340/711; 340/798; 340/802; 340/813; 340/693
[58] Field of Search ............... 340/706, 798, 802, 813, 340/693, 711

[56] References Cited

U.S. PATENT DOCUMENTS 3,750,138  7/1973  Burgan et al. .................... 340/706 X
3,976,995  8/1976  Sebestyen ........................ 340/706 X Primary Examiner—David L. Trafton

[57] ABSTRACT

An electronic checklist uses solid state readouts to display alphanumeric data such as would be found in a short but concise checklist. Operation of the checklist is enhanced by interfacing circuitry which contains page and line selecting features. A chip select decoder and a character sequencing counter operate in conjunction with other ROM addressing circuits to route characters from the ROM to the display. An emergency power supply circuit and a voltage regulator circuit are also given.

2 Claims, 3 Drawing Figures

ELECTRONIC CHECKLIST USING SOLID STATE READOUTS

SUMMARY

The electronic checklist incorporates digital technology with solid state readouts to provide prescribed sequential instructions which are selected by the user. This is accomplished by a display format which allows sixteen alphanumeric characters to be presented at one time. The user selects the instruction set and then increments the instructions in the set after each one is accomplished.

A rechargeable battery supplies emergency power for three of the instruction sets should the primary input power fail. The battery is recharged whenever the checklist is in use.

DESCRIPTION OF THE INVENTION

General

Figure 1:
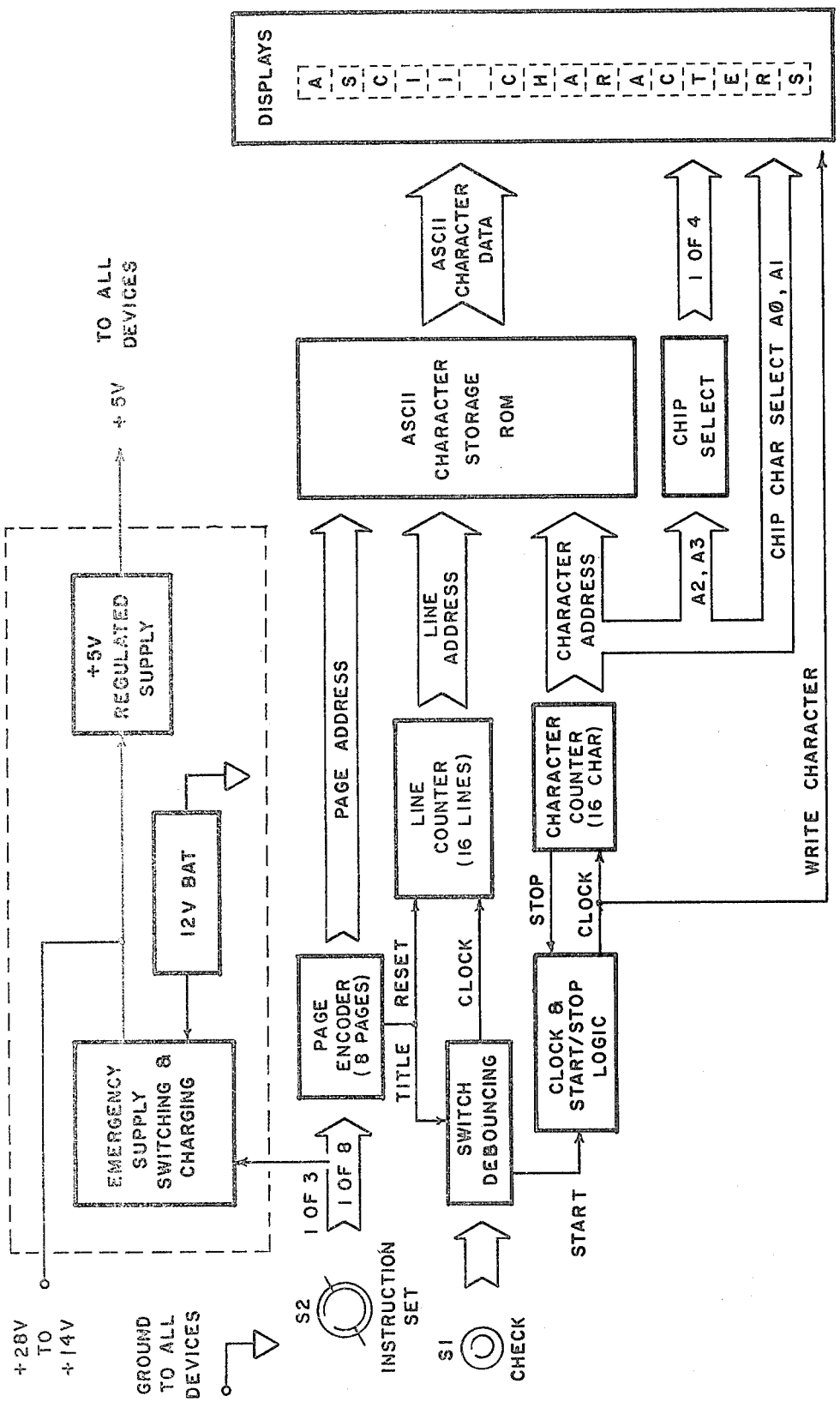
FIG. 1 is a block diagram level description of the electronic checklist showing how the major areas of the circuit interface with one another.

For the following description, refer to FIG. 1.

In FIG. 1, the fundamental principle described by the block diagram centers around the ASCII character storage ROM and the access and transfer of its information to the solid state alphanumeric readouts.

The ROM itself can easily be encoded with alphanumeric data (which consists of seven bit words representing one of 128 possible ASCII characters) by supplying a ROM manufacturer with eight level punched paper tape. This tape can be punched on a teletype terminal and thus can be made by anyone familiar with the art. The alphanumeric data is encoded in an eight by 2048 word ROM (only seven of the eight bits are needed for each word).

Once a ROM is encoded, the remainder of the circuit addresses each stored word and transfers it to the displays which decode the ASCII word and represent the character on a light emitting diode matrix.

To address a stored word in ROM, a combination of eleven bits is needed ($2^{11}$ allocating 2048 words). Since the display can accept sixteen characters, the four least significant address bits of the ROM are presented in binary numerical order. These bits are sequenced by the Character Counter which is driven by a Clock. The Clock is started by an operator command, via the Switch Debouncing circuit, counts sixteen pulses and is stopped by a command from the Character Counter.

There are four display chips, each chip having four character matrices. On each chip, the character position is determined by the least two significant address bits A$\phi$ and A1. Since each pulse of the Clock determines a character, the Clock pulses are also used as character write commands.

In order to fill each chip with four characters, the two most significant bits of a character address (A2,A3) are input into a one of four decoder which is used as a chip select driver. Therefore, every time the Check switch is activated, sixteen characters are written on the display. These characters form a line of instruction.

Each line of instruction is represented by the next four significant address bits of the ROM (ie. A4 to A7); the four bits representing sixteen lines. The bits are sequenced by a counter which receives an input from the Check switch via the Switch Debouncing circuit. The sixteen lines form a page of instructional information.

A page of instructional information is defined by a combination of the three most significant address bits of the ROM. Each of eight pages can be independently selected by the instruction Set Switch via the Page Encoder. The Page Encoder has an output which activates the Switch Debouncing circuit that in turn outputs a Start command which enters sixteen characters on the display. These characters form the title of the instruction set. Simultaneously, the same output holds the Line Counter at zero count (RESET) such that the first of sixteen lines is always the title.

To enable operation of the checklist under emergency conditions (ie. input power shorted or power cutoff), an emergency power supply operating off of a twelve volt rechargeable battery is provided. Three of the instruction sets are dedicated for emergency use and activate the emergency power supply by a command line which is decoded from one of three positions on the Instruction Set switch. The Emergency Supply Switching and Charging circuit provides for battery power under emergency use while keeping the Battery charged any time normal power is supplied to the power input.

Emergency and normal power inputs are regulated by a plus five volt Regulated Supply that has an output available to all devices on the checklist circuits.

DETAILED DESCRIPTION

Figure 2:
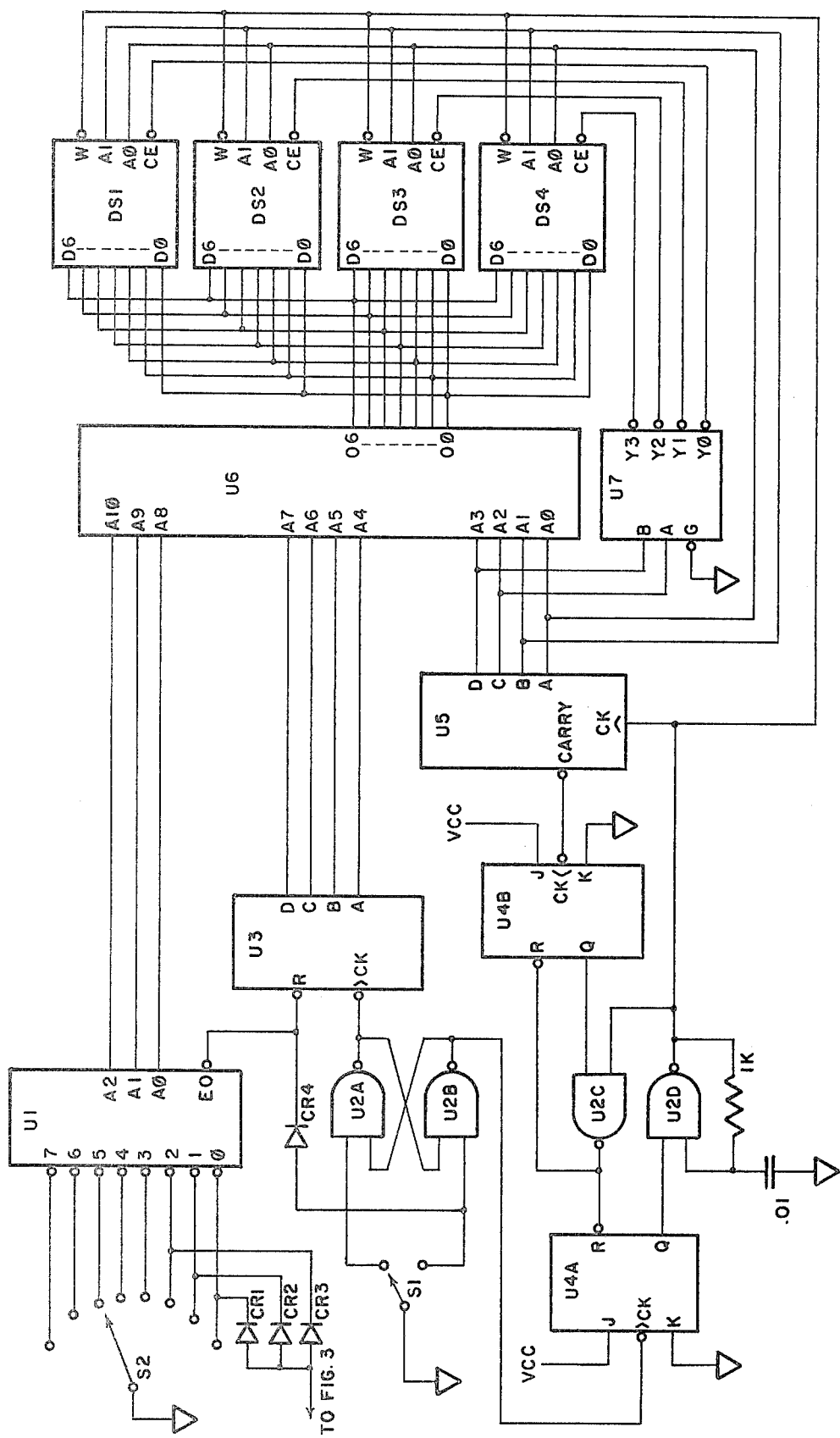
FIG. 2 is the electronic circuit design showing the connection of components necessary to implement the selection and display of alphanumeric characters.

Refer to FIG. 2 for the following description.

The devices represented in FIG. 2 operate at TTL levels and are commonly available electronic components. VCC refers to the +5 V supply and is a term used to denote pull up of an input to a device.

Switch S2 is a rotary switch having its common terminal grounded. Three of the outputs are decoded by diodes CR1, CR2, and CR3 to operate the Emergency Supply Switching and Charging circuit shown in FIG. 3.

Device U1 is a priority one of eight encoder which forms the Page Encoder and utilizes low true inputs ($\phi$ to 7) and high true outputs (A$\phi$ to A2). Output EO is low true whenever all inputs are high (false). This output is applied to a counter to activate the reset state thereby returning all outputs to binary zero (low).

Diode CR4 applies the EO output to one input of "NAND" gate U2B which causes the output to go high. CR4 also protects the reset of U3 from happening when switch S1 is activated.

"NAND" gates U2A and U2B form an R-S flip-flop used as a debouncing circuit in order that only one pulse be obtained from either output when switch S1 is activated. The negative going pulse output from U2A is used to clock U3 which outputs sixteen binary combinations on four lines. U3 forms the Line Counter. The output from U2B is used as the Start pulse to U4A.

U4A is a J-K flip-flop which is activated by the negative going edge of the Start pulse command n activated, inputs J and K determine that output Q goes high which enables the input of U2D.

U2D is a "NAND" gate configured as a free running clock which has a frequency determined by the associated resistor and capacitor feedback network. The clock will operate whenever the input from the Q output of U4A is high. This takes place when the sixteen character count is initialized.

U5 is a sixteen count binary counter which forms the Character Counter. It counts on the rising edge of the output from U2D. When the sixteenth count is terminated, the Carry output is driven low activating the clock input of U4B.

U4B is a J-K flip-flop which has the J and K inputs fixed such that the Q output goes high on a negative going clock input. The output of U4B enables "NAND" gate U2C such that the next rising edge of the output from U2D causes the output from U2C to go low resetting U4A and U4B. When U4A is reset, the clock function output remains high and thus the clock is stopped after sixteen pulses have occurred.

U6 is a 16 K bit ROM (16384) that is used as an eight bit word by 2048 word ASCII character storage device. The addressing inputs A$\phi$ through A1$\phi$ are high true in the combination necessary to select a word. The outputs, seven of which are used out of eight possible, are designated O$\phi$ through O6.

Each of the ROM outputs are connected to each of the four display chips DS1 through DS4. To accept an ASCII word, a chip must first be enabled (CE) by a low true signal from the one of four demultiplexer U7. U7 is the Chip Select source and has its outputs constantly enabled by grounding input G. ROM address bits A$\phi$ and A1 define the character position on the chip. Then, a low true write command (W) causes the chip to write the character on the matrix display. Thus as the ROM addresses are sequenced, sixteen characters are also written onto the display.

Figure 3:
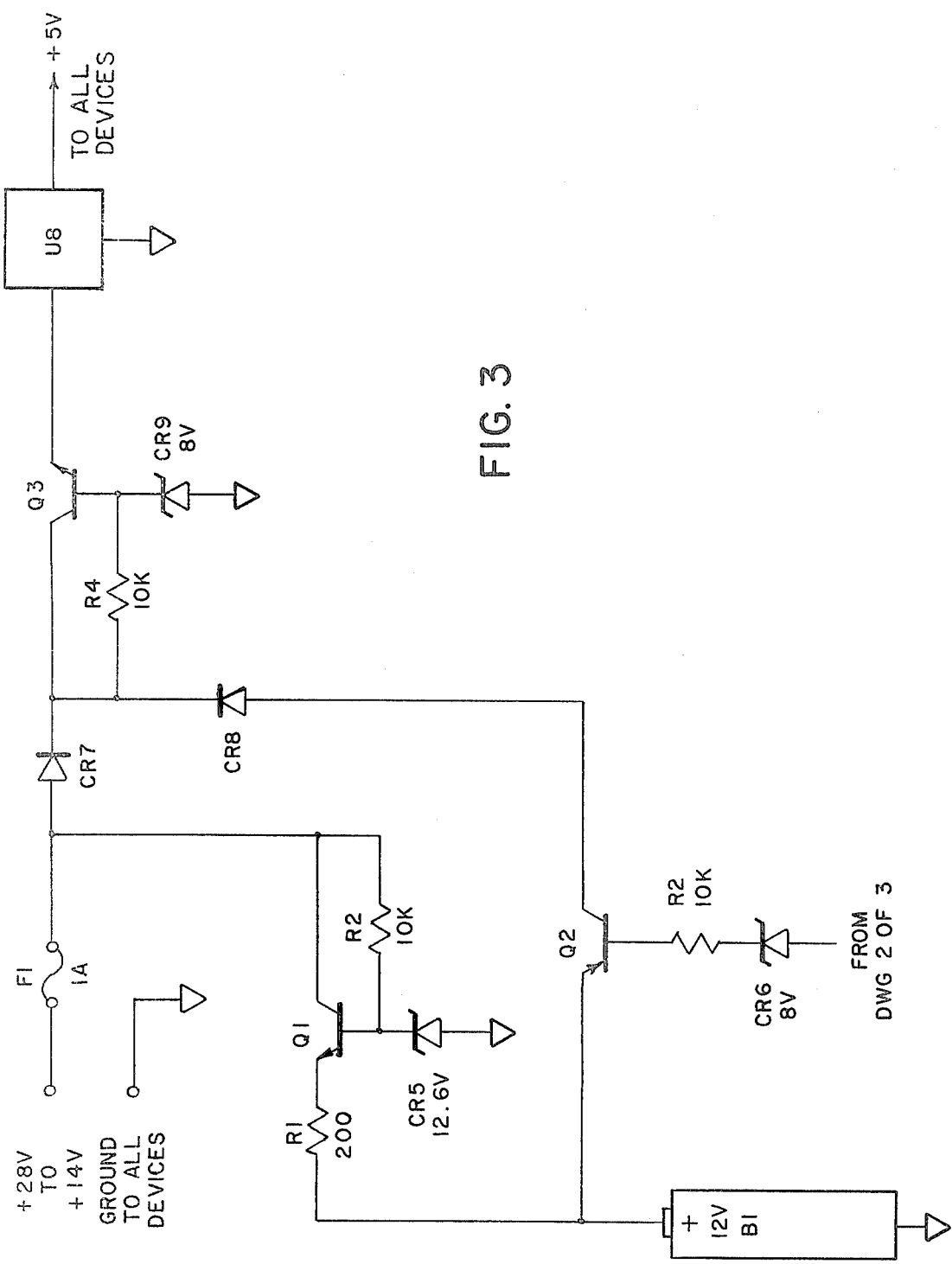
FIG. 3 shows the circuit design and connection of components forming an emergency power supply, switching and charging circuit, and regulated power supply.

For the following description, refer to FIG. 3.

In FIG. 3, F1 is a one amp fuse which is connected to a +14 volt to +28 volt direct current input. F1 is also connected to Q1 which together with R1, R2, and CR5 form the battery charging circuit. R2 biases CR5, a zener diode, which drops 12.6 volts across it and allows Q1 to operate as a voltage source. The emitter of Q1 will then be at 12 volts, the maximum voltage charge desirable on Battery B1. R1 is a current limiting resistor that protects Battery B1 from excessive charge rates.

Q2 together with R2 and CR6 form the Emergency Power Supply switching circuit. CR6, a zener diode, drops the 12 volt battery voltage to TTL levels. A low (0.6 volts or less) derived through diodes from switch S2 on Drawing 2 of 3 will bias Q2 to act as a switch allowing power to be applied through CR8 to the collector of Q3. CR7 and CR8 act as a diode switch which prohibits power from being applied back through F1 to the power input terminals under emergency conditions.

Q3 together with R4 and CR9 act as a voltage regulator. Input derived voltage levels allow R4 to bias zener diode CR9 which drops 8 volts permitting the emitter of Q3 to operate at 7.6 volts. This almost constant voltage permits Voltage Regulator U8 to operate with a highly accurate +5 volt output.

I claim:

1. In an electronic checklist using solid state readouts, characters of alphanumeric information may be displayed by a means comprised of:
    an operator actuated rotary switch, said switch being connected to an encoder, said encoder having an output forming the most significant bits of a read only memory address, each combination of bits delineating a portion of said memory;
    an operator actuated momentary switch, said switch being one of two inputs to a debouncing circuit, said debouncing circuit having two outputs, one of which forms an input to a counter, said counter having an output forming the next most significant bits of said read only memory address, each combination of bits delineating a portion of read only memory address subsequent to portion delineated by output of said encoder;
    a second input to said debouncing circuit from said encoder in combination thereof with said momentary switch resulting in the activation of a clock, said clock having an output forming the input to a second counter, said second counter having one of a combination of outputs which deactivates said clock after a prescribed number of clock pulses, other outputs of said second counter forming the least significant address bits of said read only memory;
    a decoder having inputs derived from outputs of said second counter, said decoder having one of a number of mutually exclusive outputs each forming an input to an alphanumeric display cluster;
    alphanumeric display clusters each having an input derived from said read only memory, said decoder, said clock, and said second counter, said read only memory containing encoded alphanumeric data, said decoder providing cluster selection, said second counter providing display character selection, and said clock providing character write commands.

2. In an electronic checklist using solid state readouts as described in claim 1, an emergency power supply means is comprised of a battery which is rechargeable, said battery having an output controlled by a switching and charging circuit that is controlled by certain switch positions of said rotary switch, charging of said battery being accomplished by application of normal input power, the said emergency power supply having its output protected by a diode means to avoid battery depletion when not in use.

* * * * *